(12) United States Patent
Hisada et al.

(10) Patent No.: US 9,638,328 B2
(45) Date of Patent: May 2, 2017

(54) ROTATING PUMPING APPARATUS WITH SEAL MECHANISM

(71) Applicants: DENSO CORPORATION, Kariya, Aichi-pref. (JP); Advics Co., Ltd., Kariya, Aichi-pref. (JP)

(72) Inventors: Yoshitake Hisada, Kariya (JP); Takeshi Fuchida, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/186,161

(22) Filed: Feb. 21, 2014

(65) Prior Publication Data
US 2014/0239598 A1 Aug. 28, 2014

(30) Foreign Application Priority Data

Feb. 22, 2013 (JP) ................................. 2013-033365

(51) Int. Cl.
*F16J 15/3204* (2016.01)
*F16J 15/00* (2006.01)
*B60T 17/02* (2006.01)

(52) U.S. Cl.
CPC .......... *F16J 15/3204* (2013.01); *B60T 17/02* (2013.01); *F16J 15/002* (2013.01)

(58) Field of Classification Search
CPC .......... F16J 15/002; F16J 15/006; F16J 15/32; B60T 17/02
See application file for complete search history.

(56) References Cited

U.S. PATENT DOCUMENTS

| | | | | |
|---|---|---|---|---|
| 2,876,025 | A * | 3/1959 | Orloff et al. | 277/459 |
| 3,738,665 | A * | 6/1973 | Bilco | 277/558 |
| 4,284,280 | A * | 8/1981 | Bertram et al. | 277/558 |
| 4,325,557 | A * | 4/1982 | Kawamoto | 277/351 |
| 5,076,594 | A * | 12/1991 | Baugh | 277/615 |

(Continued)

FOREIGN PATENT DOCUMENTS

| | | |
|---|---|---|
| EP | 2 530 364 | 12/2012 |
| JP | 2005-030558 | 2/2005 |

(Continued)

OTHER PUBLICATIONS

Office Action dated Oct. 22, 2015 in corresponding Chinese Application No. 201410062234.9 with English translation.

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

A rotating pumping apparatus is provided which may be employed in an automotive brake system. The rotating pumping apparatus includes a sealing member and an oil seal which are disposed around a pump drive shaft, and lubricating grease disposed between the oil seal and the pump drive shaft. The sealing member is made up of a resinous ring and a rubber cup. The sealing member has formed therein a labyrinthine flow path which extends from the resinous ring to the rubber cup. The labyrinthine flow path is designed to permit fluid to flow therethrough and create the resistance to flow of the lubricating grease to avoid leakage of the grease outside the sealing member.

10 Claims, 8 Drawing Sheets

(56) References Cited

U.S. PATENT DOCUMENTS

| | | | | |
|---|---|---|---|---|
| 5,201,531 | A * | 4/1993 | Lai | F16J 15/3412 |
| | | | | 277/400 |
| 6,113,108 | A * | 9/2000 | Friend et al. | 277/549 |
| 6,264,451 | B1 * | 7/2001 | Murayama et al. | 418/171 |
| 6,347,843 | B1 * | 2/2002 | Murayama et al. | 303/116.1 |
| 6,402,266 | B1 * | 6/2002 | Ariki et al. | 303/116.4 |
| 2004/0164496 | A1 * | 8/2004 | Okada et al. | 277/549 |
| 2007/0096550 | A1 * | 5/2007 | Yamaguchi et al. | 303/10 |
| 2009/0096175 | A1 * | 4/2009 | Schwerdtfeger | 277/549 |
| 2011/0116939 | A1 * | 5/2011 | Kawabata et al. | 417/253 |
| 2011/0116949 | A1 * | 5/2011 | Kawabata | 417/410.1 |
| 2011/0241341 | A1 * | 10/2011 | Bauer et al. | 285/374 |
| 2012/0091664 | A1 | 4/2012 | Okamura et al. | |
| 2012/0099986 | A1 | 4/2012 | Hisada et al. | |
| 2012/0308424 | A1 * | 12/2012 | Tadano et al. | 418/181 |

FOREIGN PATENT DOCUMENTS

| | | |
|---|---|---|
| JP | 2006-342889 | 12/2006 |
| JP | 2011-153644 | 8/2011 |
| JP | 2012-063003 | 3/2012 |
| JP | 2012-087892 | 5/2012 |

* cited by examiner

ROTATING PUMPING APPARATUS WITH SEAL MECHANISM

CROSS REFERENCE TO RELATED DOCUMENT

The present application claims the benefit of priority of Japanese Patent Application No. 2013-33365 filed on Feb. 22, 2013, the disclosure of which is incorporated herein by reference.

BACKGROUND OF THE INVENTION

1 Technical Field of the Invention

This disclosure relates generally to a rotating pumping apparatus with a sealing mechanism in which a sealing member made of up a resinous ring and a rubber ring is disposed in a clearance between a pump housing and a shaft extending in the pump housing, and the resinous ring is placed in close contact with the shaft to create a hermetic seal.

2 Background Art

Japanese Patent First Publication No. 2012-063003 teaches a rotating pump with a sealing assembly for creating a hermetical seal between a housing and a shaft disposed inside the housing. The sealing assembly is made up of a resinous ring and a rubber ring. The rubber ring is disposed outside the resinous ring and works to elastically urge the resinous ring against the shaft to create the hermetical seal between the housing and the shaft, thereby blocking the leak of brake fluid from a pump through a gap between the housing and the shaft. The rotating pump also has an oil seal which constructs a double seal mechanism along with the sealing assembly of the resinous ring and the rubber ring. The oil seal is located farther away from the pump than the sealing assembly is.

When the pressure of the brake fluid present between the pump and the sealing assembly is elevated by the operation of the pump, so that the brake fluid leaks through the sealing assembly, the double seal mechanism serves to hold the brake fluid within a chamber between the sealing assembly and the oil seal. When the pressure of the brake fluid within the chamber drops at the end of the operation of the pump, the brake fluid returns back to the pump through a gap on the outer periphery of the sealing assembly, that is, between the rubber ring and the housing.

There is, however, a possibility that grease between the oil seal and the shaft may leak following the brake fluid returning from the chamber between the sealing assembly and the oil seal toward the pump and then enter a brake fluid circuit. Particularly, in the case where the rotating pump primes the brake fluid and supplies it to a wheel cylinder to elevate the pressure in the wheel cylinder, the rotating pump needs to be operated for a long time, thus increasing the possibility of leakage of the grease into the brake fluid circuit.

SUMMARY OF THE INVENTION

It is therefore an object of this disclosure to provide an improved structure of a rotating pumping apparatus which has a pump mounted therein and is designed to minimize the leakage of grease from between an oil seal and a shaft toward the pump when fluid is returned from a chamber between a sealing member and the oil seal back to the pump.

According to one aspect of the invention, there is provided a rotating pumping apparatus which may be employed in a brake system for automotive vehicles. The rotating pumping apparatus comprises: (a) a rotating pump; (b) a shaft which drives the rotating pump; (c) a casing which has formed therein a hole in which the shaft is disposed; (d) a sealing member which is disposed around the shaft between an inner periphery of the hole and an outer periphery of the shaft and creates a hermetical seal between the inner periphery of the hole and the shaft, the sealing member being equipped with a resinous ring and a rubber cup fit on an outer periphery of the resinous ring, the rubber cup having formed in the outer periphery thereof a first groove which extends in an axial direction of the shaft; (d) an oil seal which is disposed around the shaft between the inner periphery of the hole and the outer periphery of the shaft and creates a hermetical seal between the inner periphery of the hole and the shaft; and (d) lubricating grease disposed between the oil seal and the shaft.

The resinous ring has an end surface which faces the oil seal and is located closer to the oil seal than the rubber cup is. The end surface has formed therein a second groove which extends from an inner space of the resinous ring to an outer periphery of the resinous ring.

The second groove defines at least a portion of a labyrinthine flow path which extends from the inner space of the resinous ring to the first groove and has sections extending in a radial and a circumferential direction of the resinous ring, respectively.

The sealing member and the oil seal serve as a double seal mechanism. Specifically, when fluid leaks from a first chamber, as defined between the rotating pump and the sealing member, to a second chamber, as defined between the sealing member and the oil seal, the oil seal blocks the leakage of the fluid through the sealing member. In the case where the fluid stays between the sealing member and the oil seal, when the pressure in the first chamber is decreased by a pumping operation to be lower than that in the second chamber, the fluid is returned back to the first chamber through the first groove and the second groove, thereby avoiding the leakage of the fluid outside the oil seal.

There is also a possibility that the lubricating grease flows following the backflow of the fluid to the first chamber from the second chamber. The labyrinthine flow path is formed between the inner space of the resinous ring and the first groove. The labyrinthine flow path has the sections extending in the radial and the circumferential direction of the resinous ring, respectively. Specifically, when the fluid flows from the inner space of the resinous ring to the first groove of the rubber cup, the labyrinthine flow path serves to direct the fluid partially in the circumferential direction of the sealing member without permitting the fluid to flow only straight in the radial direction of the sealing member. The labyrinthine flow path is thin and has an increased length, thus functioning as an orifice. The labyrinthine flow path, thus, works to facilitate keeping of the lubricating grease therein, which is higher in viscosity than the fluid. Therefore, when the fluid in the second chamber returns back to the first chamber, the lubricating grease stays in the labyrinthine flow path without flowing into the first chamber.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings wherein like reference numbers refer to like or equivalent parts in several views.

First Embodiment

Figure 1:
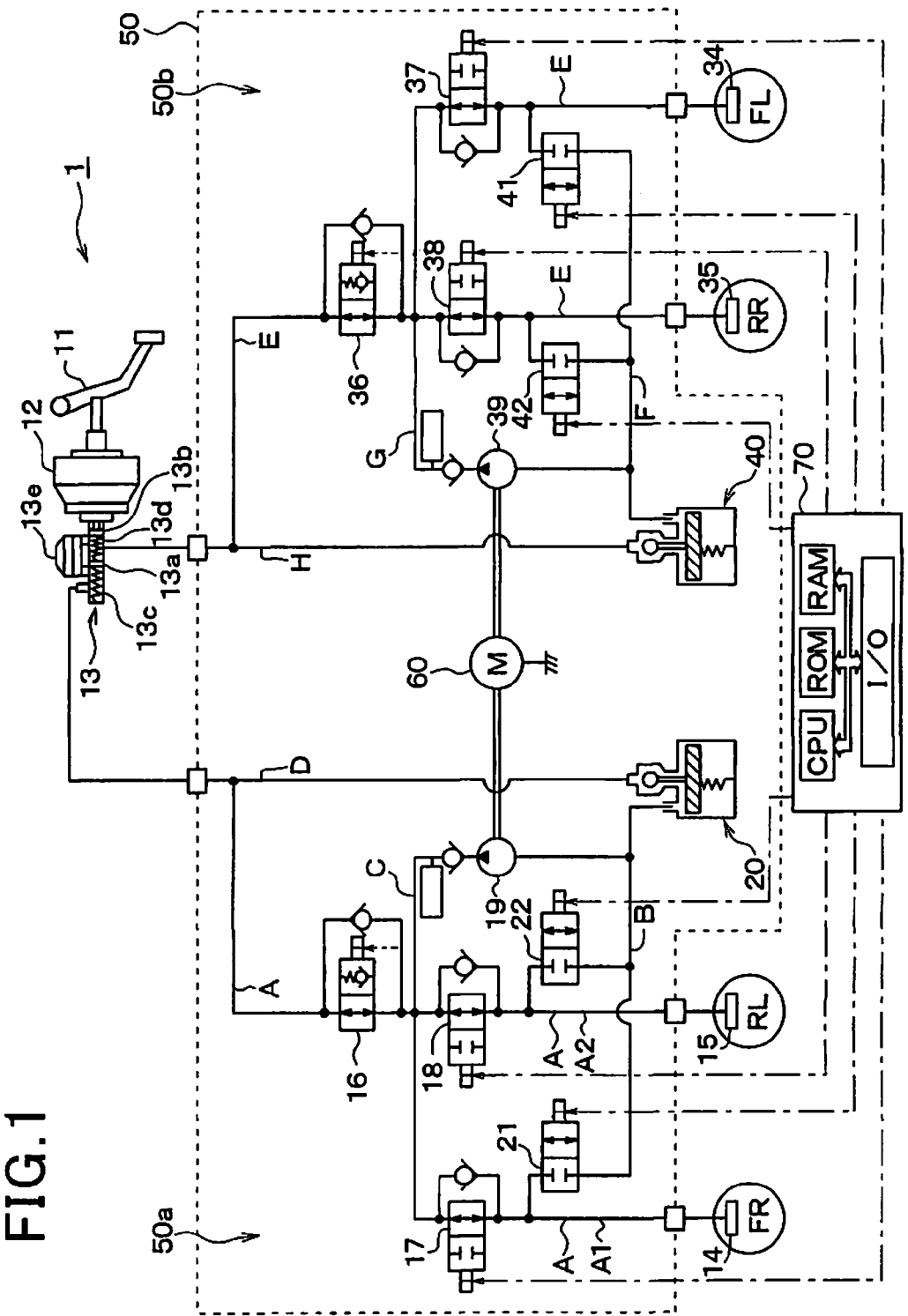
FIG. 1 is a circuit diagram which illustrates a brake system equipped with a rotating pumping apparatus according to the first embodiment of the invention.

Referring to FIG. 1, there is shown an automotive brake system equipped with a rotating pumping apparatus according to the first embodiment of the invention. The brake system, as referred to herein, is used with a front-wheel-drive vehicle equipped with a so-called diagonal split system which includes two brake hydraulic circuits one of which controls the right front and the left rear wheel and the other of which controls the left front and the right rear wheel, but may be used with a front/rear split system.

The brake system includes a brake device 1 which is equipped with a brake pedal 11 (i.e., a brake actuating member) to be depressed by a vehicle occupant or driver for applying the brakes to the vehicle, a brake booster 12, a master cylinder 13, wheel cylinders 14, 15, 34, and 35, and a brake pressure control actuator 50. The actuator 50 has a brake ECU (Electronic Control Unit) 70 installed therein.

The brake ECU 70 works to control the braking force, as developed by the brake device 1.

The brake pedal 11 is connected to the brake booster 12 and the master cylinder 13. When the driver of the vehicle depresses the brake pedal 11, the brake booster 12 works to boost the pressure applied to the brake pedal 11 and push master pistons 13a and 13b installed in the master cylinder 13, thereby developing the same pressure (which will also be referred to as M/C pressure below) in a primary chamber 13c and a secondary chamber 13d which are defined by the master pistons 13a and 13b. The M/C pressure is then transmitted to the wheel cylinders 14, 15, 34, and 35 through the actuator 50 which is equipped with hydraulic pressure paths.

A master reservoir 13e is connected to the master cylinder 13. The master reservoir 13e has fluid paths communicating with the primary chamber 13c and the secondary chamber 13d, respectively. The master reservoir 13e works to supply the brake fluid to the master cylinder 13 or store therein an excess of the brake fluid in the master cylinder 13.

The actuator 50 includes a first hydraulic circuit 50a and a second hydraulic circuit 50b. The first hydraulic circuit 50a is a hydraulic circuit working to control the brake fluid to be applied to the right front wheel FR and the left rear wheel RL. The second hydraulic circuit 50b is a hydraulic circuit working to control the brake fluid to be applied to the left front wheel FL and the right rear wheel RR.

The first hydraulic circuit 50a and the second hydraulic circuit 50b are identical in structure with each other. For the brevity of disclosure, the following discussion will refer only to the first hydraulic circuit 50a below.

The first hydraulic circuit 50a is equipped with a main hydraulic line A through which the M/C pressure is transmitted to the wheel cylinder 14 for the right front wheel FR and the wheel cylinder 15 for the left rear wheel RL to produce wheel cylinder pressures (which will also be referred to as W/C pressures below) which create the braking force.

The main hydraulic line A has disposed therein a differential pressure control valve 16 which is operable in either of two modes: an open mode and a pressure-difference mode. In a normal braking mode where it is required to produce the braking force as a function of an amount of depression of the brake pedal 11 by the driver, that is, a motion control mode is entered, the valve position of the differential pressure control valve 16 is placed in the open mode. The differential pressure control valve 16 is equipped with a solenoid coil. When the solenoid coil is energized electrically, the valve position of the differential pressure control valve 16 is moved and placed in the pressure-difference mode. Specifically, when the current supplied to the solenoid coil is increased, it sets the differential pressure control valve 16 to the pressure-difference mode. When entering the pressure-difference mode, the differential pressure control valve 16 works to control the flow of the braking fluid to elevate the W/C pressures above the M/C pressure by a pressure difference, as developed by the differential pressure control valve 16.

The main hydraulic line A is equipped with two branch lines: a hydraulic line A1 and a hydraulic line A2 which extend downstream of the differential pressure control valve 16 to the wheel cylinders 14 and 15, respectively. The hydraulic line A1 is equipped with a pressure-increasing valve 17 to increase the pressure of the brake fluid supplied to the wheel cylinder 14. Similarly, the hydraulic line A2 is equipped with a pressure-increasing valve 18 to increase the pressure of the brake fluid supplied to the wheel cylinder 15.

Each of the pressure-increasing valves 17 and 18 is implemented by a normally-open two-position valve which is opened or closed by the brake ECU 70. Specifically, when a solenoid coil installed in the pressure-increasing valve 17 is deenergized, the pressure-increasing valve 17 is opened. Alternatively, the solenoid coil is energized, the pressure-increasing valve 17 is closed. The same is true for the pressure-increasing valve 18.

The actuator 50 also includes a hydraulic line B which extends as a pressure-reducing path between a junction of the pressure-increasing valve 17 and the wheel cylinder 14 and a pressure control reservoir 20 and between a junction of the pressure-increasing valve 18 and the wheel cylinder 15 and the pressure control reservoir 20. The hydraulic line B is equipped with pressure-reducing valves 21 and 22.

The hydraulic line B has installed therein pressure-reducing valves 21 and 22 which are each implemented by a normally closed two-position solenoid valve. Specifically, when deenergized, the pressure-reducing valves 21 and 22 are closed. When energized, the pressure-reducing valves 21 and 22 are opened.

The actuator 50 also includes a hydraulic line C which extends as a recirculating line between the pressure control reservoir 20 and the hydraulic line A. The hydraulic line C is equipped with a self-priming pump 19 which is driven by an electric motor 60 to suck the brake fluid from the pressure control reservoir 20 and feed it to the master cylinder 13 or the wheel cylinders 14 and 15.

The actuator 50 also includes a hydraulic line D which extends as a sub-hydraulic line between the pressure control reservoir 20 and the master cylinder 13. In the motion control mode such as a traction control mode or an electronic stability control mode (i.e., a lateral slippage control mode), the gear pump 19 works to suck the brake fluid from the master cylinder 13 through the hydraulic line D and output it to a required one of the wheel cylinders 14 and 15 through the hydraulic line A to increase the W/C pressure of a target one of the wheels.

The second hydraulic circuit 50b is, as already described, substantially identical in structure with the first hydraulic circuit 50a. Specifically, the second hydraulic circuit 50b is equipped with a differential pressure control valve 36, pressure-increasing valves 37 and 38, pressure-reducing valves 41 and 42, a pressure control reservoir 40, and a gear pump 39. The differential pressure control valve 36 corresponds to the differential pressure control valve 16. The pressure-increasing valves 37 and 38 correspond to the pressure-increasing valves 17 and 18. The pressure-reducing valves 41 and 42 correspond to the pressure-reducing valves 21 and 22. The pressure control reservoir 40 corresponds to the pressure control reservoir 20. The gear pump 39 corresponds to the gear pump 19. The second hydraulic circuit 50b also includes hydraulic lines E, F, G, and H which correspond to the hydraulic lines A, B, C, and D. The brake device 1 has the above described hydraulic system. The rotating pumping apparatus, as referred to in this embodiment, is equipped with an assembly of the gear pumps 19 and 39 working as rotating pumps. The structure of the rotating pumping apparatus will be described later in detail.

The brake ECU 70 serves as a controller in the brake device 1 and is implemented by a typical microcomputer made up of a CPU, a ROM, a RAM, an I/O device, etc. The brake ECU 70 executes various operations, as instructed by programs stored in the ROM to control the motion of the vehicle in the motion control mode such as an anti-lock brake control mode or an electronic stability control mode.

Specifically, the brake ECU 70 calculates physical quantities, as indicated by outputs of sensors (not shown), and determines whether the motion control mode should be performed or not using the calculated physical quantities. When it is required to perform the motion control mode, the brake ECU 70 calculates a controlled variable for a target one of the wheels, that is, a target W/C pressure to be developed in a corresponding one of the wheel cylinders 14, 15, 35, or 34 and then controls the operations of the valves 16 to 18, 21, 22, 36 to 38, 41, and 42 and the operation of the motor 60 which drives the gear pumps 19 and 39 to achieve the target W/C pressure.

When the master cylinder 13 produces no pressure, for example, in the traction control mode or the electronic stability control mode, the brake ECU 70 activates the gear pump 19 and 39 and places the differential pressure control valves 16 and 36 in the pressure difference mode, thereby supplying the brake fluid downstream of the differential pressure control valves 16 and 36, that is, to the wheel cylinders 14, 15, 34, and 45 through the hydraulic lines D and H. The brake ECU 70 then selectively controls the operations of the pressure-increasing valves 17, 18, 37, and 38 or the pressure-reducing valves 21, 22, 41, and 42 to increase or decrease the W/C pressure in a target one(s) of the wheel cylinders 14, 15, 34, and 35 into agreement with a target value.

When the anti-lock brake control mode is entered, that is, the anti-lock brake system (ABS) is activated, the brake ECU 70 selectively controls the operations of the pressure-increasing valves 17, 18, 37, and 38 or the pressure-reducing valves 21, 22, 41, and 42 to increase or decrease the W/C pressure in a target one(s) of the wheel cylinders 14, 15, 34, and 35 into agreement with a target value.

Figure 2:
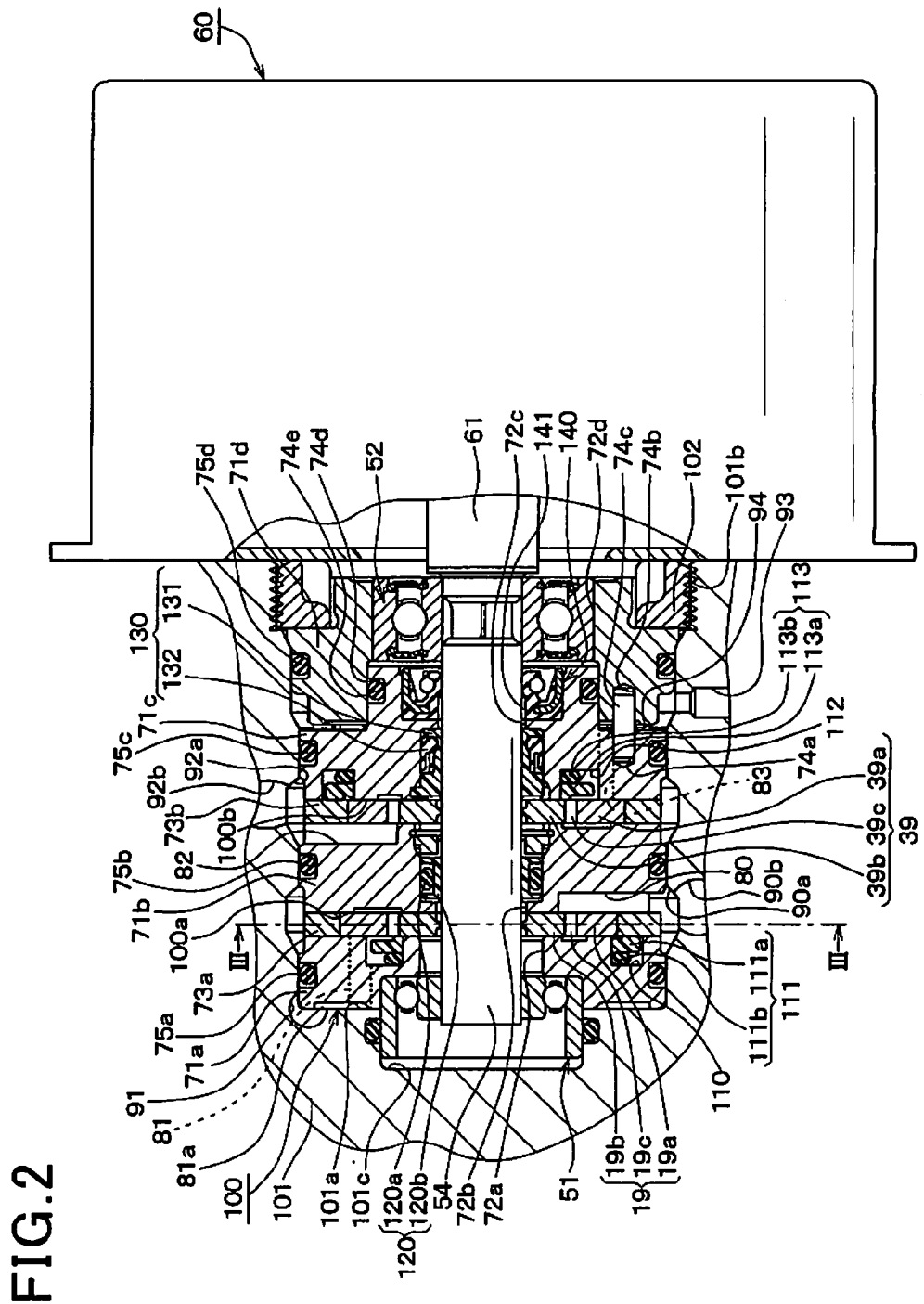
FIG. 2 is a partially sectional view which illustrates a pump body of the rotating pumping apparatus secured to a housing of an actuator.

The structure of the rotating pumping apparatus, that is, the structure of the gear pumps 19 and 39 installed in the brake device 1 will be described below with reference to FIG. 2. FIG. 2 is a partially sectional view which illustrates a pump body 100 of the rotating pumping apparatus secured to a housing 101 of the actuator 50. The vertical direction in the drawing is the vertical direction of the vehicle.

The automotive brake system is, as described above, equipped with two hydraulic systems: the first hydraulic circuit 50a and the second hydraulic circuit 50b and thus has the pump body 100 made up of the gear pump 19 for the first hydraulic circuit 50a and the gear pump 39 for the second hydraulic circuit 50b.

The gear pumps 19 and 39 installed in the pump body 100 are driven by rotation of a shaft 54 through the motor 60. The shaft 54 is retained by a first bearing 51 and a second bearing 52. A casing which serves as an outer shell of the pump body 100 is made up of a first, a second, a third, and a fourth cylinder 71a, 71b, 71c, and 7d (which will also be referred to as side plates below) and a first and a second center plate 73a and 73b. The first and second center plates 73a and 73b are cylindrical. The first bearing 51 is mounted in the first cylinder 71a. The second bearing 52 is mounted in the fourth cylinder 71d.

The first cylinder 71a, the first center plate 73a, the second cylinder 71b, the second center plate 73b, and the third cylinder 73c are stacked on each other in this order and welded together on their outer periphery as a single assembly which will also be referred to as a first casing below. The first casing is disposed coaxially or in alignment with the fourth cylinder 71d which will also be referred to as a second casing. The first casing and the second casing are arranged in this way to form a shell or casing of the pump body 100.

The third cylinder 71c and the fourth cylinder 71d have holes or recesses 74a and 74b formed in surfaces thereof facing each other. A pin 74c is fit in the recesses 74a and 74b to lock the rotation of the third cylinder 71c and the fourth cylinder 71d and position the third cylinder 71c and the fourth cylinder 71d in a circumferential direction thereof.

The pump body 100 is assembled in the way, as described above, and fitted from the right side of the drawing into a substantially cylindrical mount chamber 101a formed in the housing 101 of the actuator 50. Such a fitting direction will also be referred to as an insertion direction below.

The mount chamber 101a has an internal thread 101b formed in an inner end wall thereof. An annular screw 102 which has an external thread is fastened into engagement with the internal thread 101b to retain the pump body 100 in the housing 101 firmly.

The housing 101 also has a cylindrical center chamber 101c formed in a central portion of the bottom of the mount chamber 101a which is aligned with a shaft 54 (i.e., an output shaft) of the motor 60. In other words, the center chamber 101c is located coaxially with the shaft 54. The center chamber 101c will also be referred to as a second chamber below. The second chamber 101c has a first bearing 51 fit therein. An area of the bottom of the mount chamber 101a other than the second chamber 101c are in contact abutment with the end surface of the first cylinder 71a.

The first to fourth cylinders 71a to 71d have a first, a second, a third, and a fourth center holes 72a, 72b, 72c, and 72d, respectively. The first to fourth center holes 72a to 72d are aligned with each other to define a shaft hole into which the shaft 54 is inserted. The shaft 54 is retained to be rotatable by the first bearing 51 and the second bearing 52 which are mounted in the first center hole 72a of the first cylinder 71a and the fourth center hole 72d of the fourth cylinder 71d, respectively.

Figure 3:
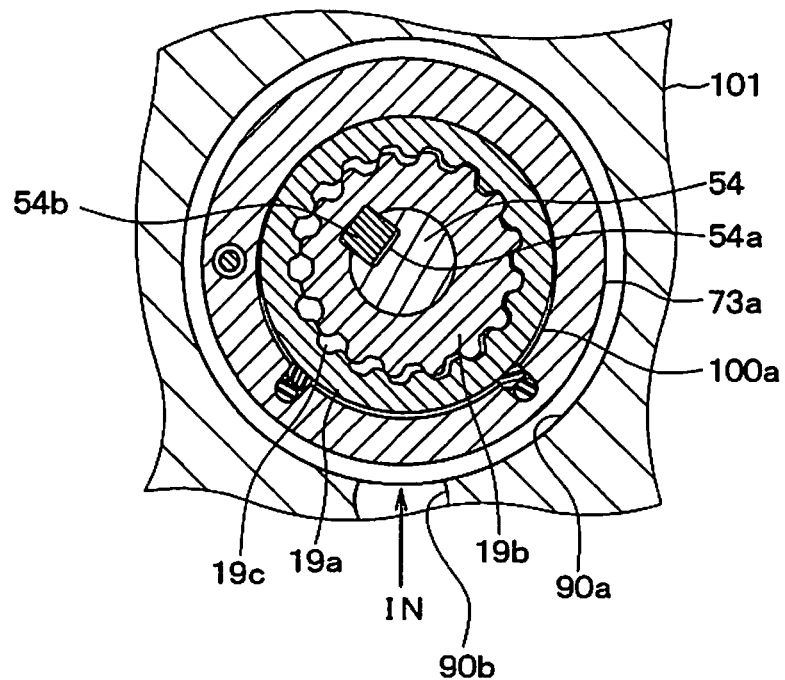
FIG. 3 is a traverse sectional view, as taken along the line in FIG. 2.

The gear pumps 19 and 39 are arranged between the first and second bearings 51 and 52. The structure of the gear pumps 19 and 39 will be described below with reference to FIG. 3.

The gear pump 19 is disposed in a rotor chamber 100a defined in the first center plate 73a sandwiched between the first and second cylinders 71a and 71b. The gear pump 19 is implemented by an internal gear trochoid pump which is driven by the shaft 54 of the motor 60.

Specifically, the gear pump 19 is equipped with a rotating assembly made up of an outer rotor 19a and an inner rotor 19b. The shaft 54 is fit in a center hole of the inner rotor 19b. A key 54b is fit in a hole 54a formed in the shaft 54 and works to transmit torque of the shaft 54 to the inner rotor 19b. The outer rotor 19a has inner teeth formed on an inner periphery thereof. The inner rotor 19b has outer teeth formed on an outer periphery thereof. The inner teeth of the outer rotor 19a mesh with the outer teeth of the inner rotor 19b so as to create a plurality of gaps or enclosed cavities 19c therebetween. The cavities 19c are changed in volume thereof with rotation of the shaft 54, thereby sucking or discharging the brake fluid.

The gear pump 39 is, like the gear pump 19, disposed in a rotor chamber 100b defined in the second center plate 73b sandwiched between the second and third cylinders 71b and 71c. The gear pump 39 is implemented by an internal gear trochoid pump and, like the gear pump 19, includes a rotating assembly made up of an outer rotor 39a and an inner rotor 39b. The outer rotor 39a has inner teeth formed on an inner periphery thereof. The inner rotor 39b has outer teeth fowled on an outer periphery thereof. The inner teeth of the outer rotor 39a mesh with the outer teeth of the inner rotor 39b so as to create a plurality of gaps or enclosed cavities 39c therebetween. The cavities 39c are changed in volume thereof with rotation of the shaft 54, thereby sucking or discharging the brake fluid. The gear pump 39 is located at an angular position which is 180° away from the gear pump 19 around the axis of the shaft 54. In other words, the layout of the cavities 39c is diametrically opposed to, that is, symmetrical with that of the cavities 19c of the gear pump 19 about the axis of the shaft 54. This cancels high pressures of the brake fluid each other which are developed at outlets of the gear pumps 19 and 39 and adversely exerted on the shaft 54.

The second cylinder 71b, as illustrated in FIG. 2, has formed therein an inlet port 80 which communicates with one(s) of the cavities 19c of the gear pump 19 through which the brake fluid is sucked into the gear pump 19. The inlet port 80 is formed in an end surface of the second cylinder 71b which faces the gear pump 19 and extends to the outer periphery of the second cylinder 71b. The housing 101 has an annular groove 90a formed in an inner wall thereof exposed to the mount chamber 101a. The annular groove 90a is fully closed, that is, extends over the whole of the circumference of the mount chamber 101a. The housing 101 also has formed therein an inlet path 90b which communicates with the inlet port 80 through a portion of the annular groove 90a. The gear pump 19 sucks the brake fluid from outside thereof through the inlet path 90b, the annular groove 90a, and the inlet port 80.

The first cylinder 71a, as illustrated in FIG. 2, has formed therein an outlet port 81 which communicates with one(s) of the cavities 19c of the gear pump 19 through which the brake fluid is discharged from the gear pump 19. The outlet port 81 extends from one of opposed end surfaces of the first cylinder 71a which faces the gear pump 19 to the other end surfaces, that is, passes through the thickness of the first cylinder 71a. The housing 101 has formed therein an outlet path 91 which leads to the bottom of the mount chamber 101a. The outlet port 81 is connected to the outlet path 91. The gear pump 19 works to output the brake fluid outside the pump body 100 from the bottom of the mount chamber 101a through the outlet port 81 and the outlet path 91. More specifically, the outlet port 81 has the following structure.

The outlet port 81 includes a hole which, as described above, extends through the thickness of the first cylinder 71a and an annular groove 110 formed in the end surface of the first cylinder 71a which faces the gear pump 19. The annular groove 110 surrounds the shaft 54.

Specifically, a seal ring 111 is so disposed in the annular groove 110 as to elastically press the outer rotor 19a and the inner rotor 19b. The seal ring 111 is made of an assembly of a resinous member 111a and a rubber member 111b. The resinous member 111a is arranged closer to the outer rotor 19a and the inner rotor 19b (i.e., the gear pump 19) than the rubber member 111b is. The rubber member 111b is disposed to press the resinous member 111a against the gear pump 19. One(s) of the cavities 19c which serves as the inlet of the gear pump 19, that is, communicates with the inlet port 80 and a portion of a clearance which is created between the outer periphery of the outer rotor 19a and the first center plate 73a and opposed to the one(s) of the cavities 19c serving as the inlet of the gear pump 19 in the radial direction of the gear pump 19 are located on the inner side of the seal ring 111, while one(s) of the cavities 19c which serves as the outlet of the gear pump 19, that is, communicates with the outlet port 81 and a portion of the clearance which is created between the outer periphery of the outer rotor 19a and the first center plate 73a and opposed to the one(s) of the cavities 19c serving as the outlet of the gear pump 19 in the radial direction of the gear pump 19 are located on the outer side of the seal ring 111. In other words, the seal ring 111 has a sealing surface which contacts with the end surface of the gear pump 19 to hermetically isolate a lower-pressure portion and a higher-pressure portion of the gear pump 19 from each other.

The seal ring 111 is placed in direct contact with the whole of an inner circumference of the annular groove 110 and partially in direct contact with an outer circumference of the annular groove 110. Specifically, a gap is created between the outer circumference of the annular groove 110 and a portion of the outer circumference of the seal ring 111. In other words, the annular groove 110 has a region where the annular groove 110 is separate from the outer circumference of the seal ring 111 and where the brake fluid is permitted to flow. The outlet port 81 includes such a region of the annular groove 110.

The first cylinder 71a has a connecting path 81a formed on the front end surface (i.e., the left end surface, as viewed in FIG. 2) thereof in the insertion direction, as described above. The connecting path 81a communicates between the outlet port 81 and the outlet path 91. The connecting path 81a extends around the whole of the circumference of the first bearing 51, thereby ensuring the stability of the fluid communication between the outlet port 81 and the outlet path 91 regardless of the angular location of the outlet path 91 in the first cylinder 71a. Specifically, in assembling of the first cylinder 71a into the housing 101 in the absence of the connecting path 81a, when the first cylinder 71a is put on the bottom of the mount chamber 101a, it may result in no gap between the end surface of the first cylinder 71a and the bottom of the mount chamber 101a, that is, failure in communication between the outlet port 81 and the outlet path 91. In order to eliminate this problem, a groove is formed in the end surface of the first cylinder 71a to define the connecting path 81a which establishes the fluid communication between the outlet port 81 and the outlet path 91.

The second cylinder 71b, as illustrated in FIG. 2, has an inlet port 82 formed in the end surface thereof which is opposed to the end surface in which the inlet port 80 is formed. The inlet port 82 communicates with one(s) of the cavities 39c of the gear pump 39 through which the brake fluid is sucked into the gear pump 39. The inlet port 82 is formed in the end surface of the second cylinder 71b which faces the gear pump 39 and extends to the outer periphery of the second cylinder 71b. The housing 101 has an annular groove 92a formed in the inner wall thereof exposed to the mount chamber 101a. The annular groove 92a is fully closed, that is, extends over the whole of the circumference of the mount chamber 101a. The housing 101 also has formed therein an inlet path 92b which communicates with the inlet port 82 through a portion of the annular groove 92a. The gear pump 39 sucks the brake fluid from outside thereof through the inlet path 92b, the annular groove 92a, and the inlet port 82.

The third cylinder 71c, as illustrated in FIG. 2, has formed therein an outlet port 83 which communicates with one(s) of the cavities 39c of the gear pump 39 through which the brake fluid is discharged from the gear pump 39. The outlet port 83 extends from one of opposed end surfaces of the third cylinder 71c which faces the gear pump 39 to the other end surfaces, that is, passes through the thickness of the third cylinder 71c. The housing 101 has formed therein an outlet path 93 which leads to the inner periphery of the mount chamber 101a. The outlet port 83 is connected to the outlet path 93 through a gap 94 between the third cylinder 71c and the fourth cylinder 71d. The gear pump 39 works to output the brake fluid outside the outer periphery of the pump body 100 through the outlet port 83, the gap 94, and the outlet path 93. More specifically, the outlet port 83 has the following structure.

The outlet port 83 includes a hole which, as described above, extends through the thickness of the third cylinder 71c and an annular groove 112 formed in the end surface of the third cylinder 71c which faces the gear pump 39. The annular groove 112 surrounds the shaft 54.

Specifically, a seal ring 113 is so disposed in the annular groove 112 as to extend partially over the outer rotor 39a and the inner rotor 39b. The seal ring 113 is made of an assembly of a resinous member 113a and a rubber member 113b. The resinous member 113a is arranged closer to the outer rotor 39a and the inner rotor 39b (i.e., the gear pump 39) than the rubber member 113b is. The rubber member 113b is disposed to press the resinous member 113a against the gear pump 39. One(s) of the cavities 39c which serves as the inlet of the gear pump 39, that is, communicates with the inlet port 82 and a portion of a clearance which is created between the outer periphery of the outer rotor 39a and the second center plate 73b and opposed to the one(s) of the cavities 39c serving as the inlet of the gear pump 39 in the radial direction of the gear pump 39 are located on the inner side of the seal ring 113, while one(s) of the cavities 39c which serves as the outlet of the gear pump 39, that is, communicates with the outlet port 83 and a portion of the clearance which is created between the outer periphery of the outer rotor 39a and the second center plate 73b and opposed to the one(s) of the cavities 39c serving as the outlet of the gear pump 39 in the radial direction of the gear pump 39 are located on the outer side of the seal ring 111. In other words, the seal ring 113 has a sealing surface which contacts with the end surface of the gear pump 39 to hermetically isolate a lower-pressure portion and a higher-pressure portion of the gear pump 39 from each other.

The seal ring 113 is placed in direct contact with the whole of an inner circumference of the annular groove 112 and partially in direct contact with an outer circumference of the annular groove 112. Specifically, a gap is created between the outer circumference of the annular groove 112 and a portion of the outer circumference of the seal ring 113. In other words, the annular groove 112 has a region where the annular groove 112 is separate from the outer circumference of the seal ring 113 and where the brake fluid is permitted to flow. The outlet port 83 includes such a region of the annular groove 112.

The inlet path 90b and the outlet path 91 in FIG. 2 correspond to the hydraulic line C in FIG. 1. The inlet path 92b and the outlet path 93 in FIG. 2 correspond to the hydraulic line D in FIG. 1.

The pump body 100 also includes a seal ring 120. The second center hole 72b of the second cylinder 71b has a diameter partially greater than that of the shaft 54. In other words, the second cylinder 71b has a cylindrical chamber formed in the second center hole 72b in which the seal ring 120 is disposed. The seal ring 120 serves to hermetically isolate the gear pump 19 and the gear pump 39 from each other. The seal ring 120 is made up of an O-ring 120a and a resinous ring 120b. The resinous ring 120b has an annular groove formed in an outer circumference thereof. The O-ring 120a is mounted in the annular groove of the resinous ring 120b and elastically presses the resinous ring 120b against the periphery of the shaft 54 to create a hermetical seal around the shaft 54.

Additionally, the pump body 100 also includes a seal ring 130 serving as a sealing member. The third center hole 72c of the third cylinder 71c has a diameter partially greater than that of the shaft 54. In other words, the third cylinder 71c has a cylindrical chamber formed in the third center hole 72c in which the seal ring 130 is disposed. The seal ring 130 serves to hermetically isolate the gear pump 39 from outside the housing 101. The structure of the seal ring 130 will be described later in detail.

The pump body 100 also includes an oil seal 140 which is fit on the shaft 54 and located closer to the motor 60 than the seal ring 130 is, that is, on the opposite side of the seal ring 130 to the gear pump 39. The seal ring 130 and the oil seal 140 serve as a double seal mechanism. Lubricating grease 141 is applied between the oil seal 140 and the shaft 54 to minimize a sliding resistance or friction therebetween.

The seal ring 130 serves to avoid the leakage of the brake fluid from the center hole 72c outside the pump body 100. Additionally, the oil seal 140 blocks a possible leakage of the brake fluid through the seal ring 130.

The third cylinder 71c, as clearly illustrated in FIG. 2, has a large-diameter portion and a small-diameter portion which is fit in the fourth cylinder 71d. Specifically, the small-diameter portion has a diameter less than the inner diameter of the mount chamber 101a and is fit in the center hole 72d of the fourth cylinder 71d. The small-diameter portion of the third cylinder 71c has an annular groove 74d in which an O-ring 74e is fit. The O-ring 74e works to block the leakage of the brake fluid to the second bearing 52 through a clearance between the third cylinder 71c and the fourth cylinder 71d.

Specifically, the fourth cylinder 71d has a cylindrical chamber formed in the center hole 72d into which the small-diameter portion of the third cylinder 71c is inserted. The cylindrical chamber has a depth shorter than the length of the small-diameter portion of the third cylinder 71c, so that an air gap is created between mutually facing end surfaces of the third cylinder 71c and the fourth cylinder 71d. The brake fluid discharged from the outlet port 83 of the gear pump 39 is delivered to the outlet path 93 through the gap 94.

O-rings 75a, 75b, 75c, and 75d are fit on outer peripheries of the first to fourth cylinders 71a to 71d. The O-rings 75a to 75d serve to hermetically block the leakage of the brake fluid from the inlet paths 90b and 92b and the outlet paths 91 and 93 in the housing 101. Specifically, the O-ring 75a is disposed between the inlet path 90b and the outlet path 91. The O-ring 75b is disposed between the inlet path 90b and the inlet path 92b. The O-ring 75c is disposed between the inlet path 92b and the outlet path 93. The O-ring 75d is disposed between the outlet path 93 and the end surface of the housing 101 which faces the motor 60.

The fourth cylinder 71d, as clearly illustrated in FIG. 2, has a large-diameter portion, a small-diameter portion, and a shoulder between the large-diameter portion and the small-diameter portion. The small-diameter portion is located closer to the opening of the mount chamber 101a (i.e., the motor 60) than the large-diameter portion is. The annular screw 102 (i.e., a retainer) is fit on the small-diameter portion of the fourth cylinder 71d in abutment with the shoulder in thread engagement with the housing 101, thereby retaining the pump body 100 in the housing 101 firmly.

The structure of the seal ring 130 will be described below with reference to FIGS. 4 to 6.

Figure 4:
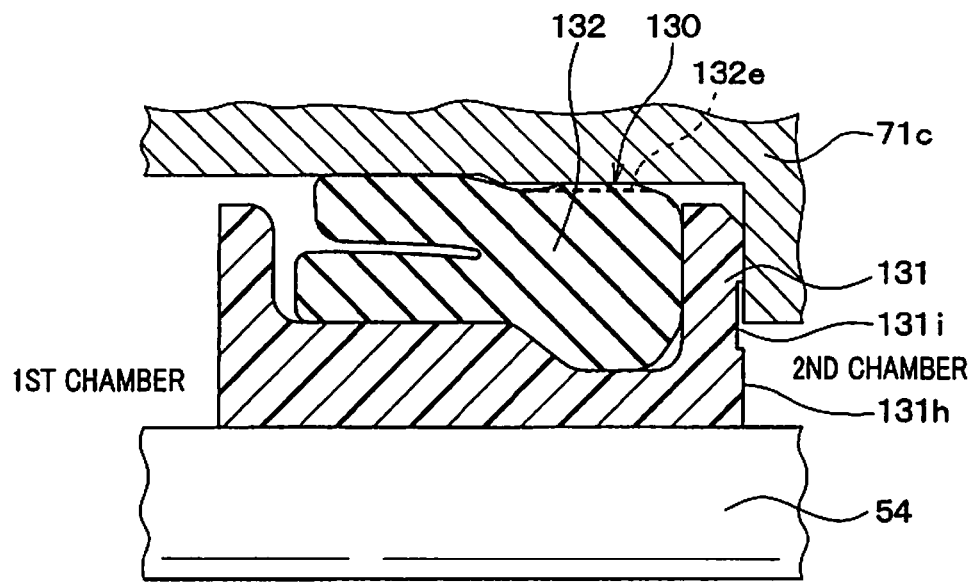
FIG. 4 is a partially enlarged vertical view which shows a configuration of a sealing member installed in the rotating pumping apparatus of FIG. 2.

The seal ring 130 is, as clearly illustrated in FIG. 4, made of an assembly of a resinous ring 131 and an annular rubber cup 132. The resinous ring 131 is made of, for example, polytetrafluoroethylene (PTFE). The rubber cup 132 is fit in a groove formed in the resinous ring 131. The rubber cup 132 elastically presses the resinous ring 131 against the outer periphery of the shaft 54, thereby creating a hermetical seal between the third cylinder 71c and the shaft 54.

Figure 5A:
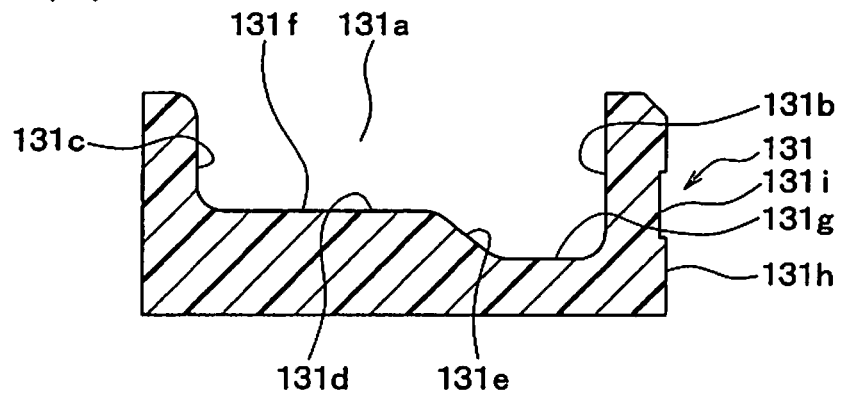
FIG. 5(a) is a partially enlarged sectional view which illustrates a resinous ring before it is installed in the rotating pumping apparatus of FIG. 2.
Figure 5B:
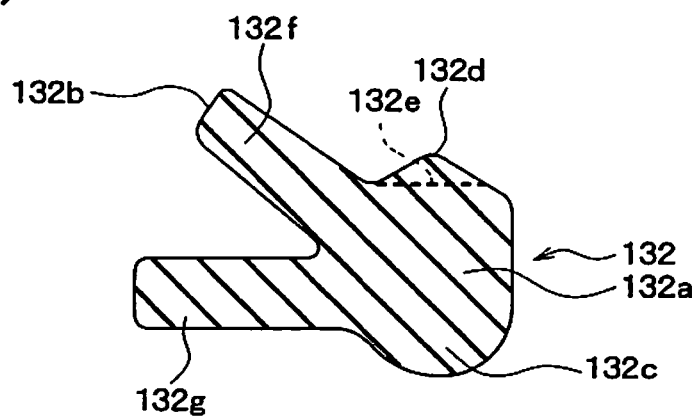
FIG. 5(b) is a partially enlarged sectional view which illustrates a rubber cup before it is installed in the rotating pumping apparatus of FIG. 2.

Specifically, the resinous ring 131 has, as illustrated in FIG. 5(a), a storage groove 131a formed in the outer periphery thereof. The storage groove 131a has a given depth in a radial direction of the resinous ring 131. The rubber cup 132 has a structure, as illustrated in FIG. 5(b) and is disposed within the storage groove 131a, as illustrated in FIG. 5(c), to complete the seal ring 130.

The storage groove 131a is, as can be seen in FIG. 5(a), defined by side walls 131b and 131c and a bottom wall 131d of the resinous ring 131. The side walls 131b and 131c are located at a given interval away from each other in the axial direction of the shaft 54 and have surfaces extending parallel to each other in the radial direction of the resinous ring 131 (i.e., a direction perpendicular to the axis of the shaft 54). The bottom wall 131d has annular steps to form two annular sections of the storage groove 131a: a shallow section and a deep section. The bottom wall 131d also has an annular slant section formed between the shallow and deep sections. The slant section is inclined at a given angle to the axial direction or the radial direction of the resinous ring 131. The shallow section of the storage groove 131a defines a lip storage chamber 131f. The deep section of the storage groove 131a defines a support storage chamber 131g. The slant section defines a slant groove 131e.

Figure 5C:
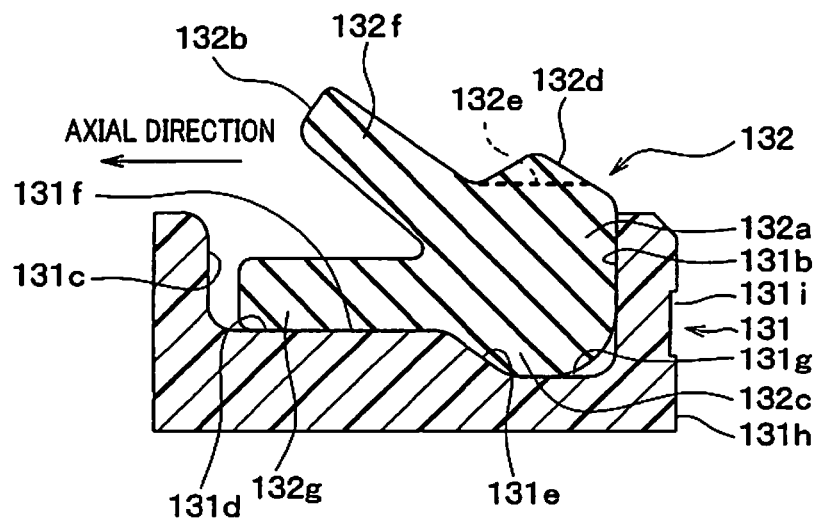
FIG. 5(c) is a partially enlarged section view which illustrates an assembly of the resinous ring and the rubber cup of FIGS. 5(a) and 5(b)
Figure 6:
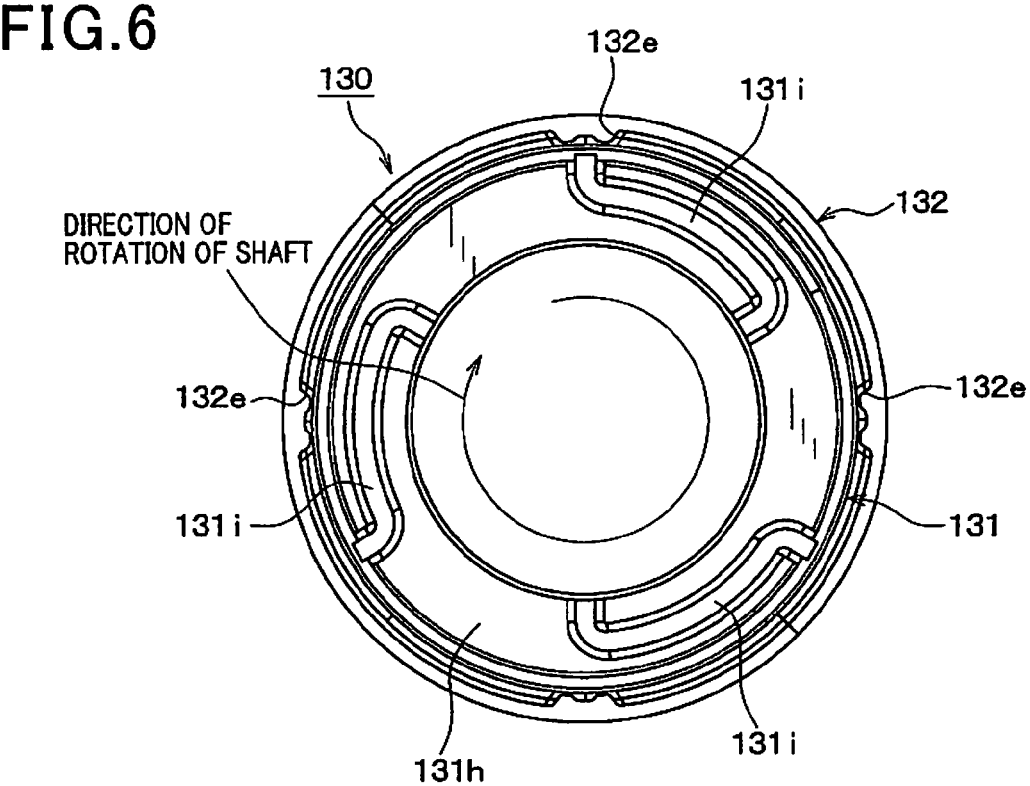
FIG. 6 is an illustration of a seal ring, as viewed from an oil seal of the rotating pumping apparatus of FIG. 2.

The resinous ring 131, as illustrated in FIGS. 5(c) and 6, has hydraulic grooves 131i formed in an end surface 131h which faces the oil seal 140 and is located closer to the oil seal 140 than the rubber cup 132 is. Each of the hydraulic grooves 131i will also be referred to as a second groove below and is designed to have, for example, a width of 0.6 mm, a depth of 0.1 mm to 0.3 mm, and an entire length of 5 mm or more.

The seal ring 130, as described above, works to block the leakage of the brake fluid outside the pump body 100 through the center hole 72c. The oil seal 140 blocks a possible leakage of the brake fluid through the seal ring 130. If the brake fluid leaks from a first chamber, as defined on the left side of the seal ring 130 in FIG. 2 facing the gear pump 39, to a second chamber, as defined on the right side of the seal ring 130, the seal ring 130, as described later in detail, serves to return the leakage of the brake fluid back to the first chamber when the pressure in the first chamber becomes lower than that in the second chamber. Specifically, the seal ring 130 permits the brake fluid to flow from the second chamber to the first chamber through a clearance between the seal ring 130 and the third cylinder 71c.

Specifically, the resinous ring 131, as illustrated in FIGS. 5(a) and 5(c), has an end surface 131h facing the oil seal 140. The end surface 131h is placed in contact abutment with the wall of the third cylinder 71c. The resinous ring 131 is, therefore, designed to have the hydraulic grooves 131i, as described above with reference to FIG. 6, which facilitate the ease with which the brake fluid flows from the center hole of the resinous ring 131 outside the outer periphery of the resinous ring 131. If, however, each of the hydraulic grooves 131i is so formed as to extend straight in parallel to the radial direction of the shaft 54, it facilitates the leakage of the grease 141 into the first chamber through the hydraulic grooves 131i.

In order to alleviate the above drawback, each of the hydraulic grooves 131i is, as can be seen in FIG. 6, formed into a substantially S-shape. Specifically, each of the hydraulic grooves 131*i* is curved to have a length extending in the radial and circumferential directions of the resinous ring 131. Specifically, each of the hydraulic grooves 131*i* has two radial sections extending in the radial direction of the resinous ring 131 and a circumferential section extending in the circumferential direction of the resinous ring 131. Assuming that the shaft 54 is rotated in the clockwise direction in FIG. 6 to activate the pump body 100, the inner of the radial sections extends in the radial direction of the resinous ring 131 from the inner periphery of the resinous ring 131 and leads to the circumferential section. The circumferential section extends in the counterclockwise direction from the inner radial section and leads to the outer of the radial sections. The outer radial section extends in the radial direction of the resinous ring 131 and leads to the outer periphery of the resinous ring 131. The number of the hydraulic grooves 131*i* is three in this embodiment, but is not limited thereto. The hydraulic grooves 131*i* are arranged at a regular or equal interval away from each other in the circumferential direction of the resinous ring 131.

The rubber cup 132 is, as illustrated in FIGS. 5(*b*) and 5(*c*), equipped with a thick annular base 132*a* and a lip mold 132*b*. The annular base 132*a* works as a support for the lip mold 132*b* and is disposed in the support storage chamber 131*g*. The lip mold 132*b* is disposed in the lip storage chamber 131*f*.

The annular base 132*a* has a supporting portion 132*c* which is of an arc-shape in cross section thereof. The supporting portion 132*c*, as will be described later in detail, protrudes from a base end of the lip mold 132, i.e., a base end of a lip 132*g*, as described later in detail, inwardly in the radial direction of the rubber cup 132. The annular base 132*a* also has an annular protrusion 132*d* formed outside the base end of the lip mold 132*b*, i.e., a base end of a lip 132*f*, as will be described later, in the radial direction of the rubber cut 132.

The supporting. portion 132*c* is fit in the support storage chamber 132*g* and also placed in contact with the slant groove 131*e* of the resinous ring 131, thereby holding the rubber cup 132 from moving in the insertion direction (i.e., the axial direction of the resinous ring 131) to ensure the stability of location of the rubber cup 132 in the resinous ring 131.

The annular protrusion 132*d* of the rubber cup 132 is elastically compressed partially or entirely by the third cylinder 71*c* when the seal ring 130 is installed between the shaft 54 and the third cylinder 71*c*, thereby creating an elastically reactive force to press the resinous ring 131 against the outer periphery of the shaft 54. The annular protrusion 132*d* has four slits 132*e* formed on an outer periphery thereof. Each of the slits 132*e* is, as can be seen in FIG. 6, defined by a groove of, for example, a W- or U-shape in cross section (which will also be referred to as a first groove below). The slits 132*e* extend in the axial direction of the rubber cup 132 and form hydraulic paths through which the brake fluid which has leaked into the above described second chamber is permitted to return back to the first chamber when the pressure in the first chamber has dropped below that in the second chamber.

The number of the slits 132*e* is, as described above, four in this embodiment, but however, not limited thereto. The slits 132*e* are, as can be seen in FIG. 6, formed by grooves which are arranged at a regular or equal interval away from each other in the circumferential direction of the rubber cup 132. The angular interval between adjacent two of the three hydraulic grooves 131*i* is, as apparent from the above discussion, different from that between adjacent two of the four slits 132*e*. Therefore, in this embodiment, at least one of the outer ends of the hydraulic grooves 131*i* which open on the outer periphery of the resinous ring 131 is located in alignment with one of the slits 132*e* in the radial direction of the seal ring 130. In FIG. 6, an uppermost one of the outer ends of the hydraulic grooves 131*i* is aligned with an uppermost one of the slits 132*e*. It is, however, preferable that all the outer ends of the hydraulic grooves 131*i* lie in misalignment with the slits 132*e* in the radial direction of the seal ring 130.

The lip mold 132*b*, as clearly illustrated in FIG. 5(*b*), has two lips extending from the annular base 132*a* in the form of a V-shape in cross section thereof. Specifically, the lip mold 132*b* is located closer to the gear pump 39 than the annular base 132*a* is and has the lips 132*f* and 132*g*. The lip 132*f* is placed in contact with the inner peripheral surface of the third cylinder 71*c*, while the lip 132*g* is placed on the bottom wall 131*d* of the resinous ring 131. The lip 132*f* is inclined at a given angle to the axial direction or the radial direction of the rubber cup 132 (i.e., the shaft 54) and compressed or deformed inwardly in the radial direction of the rubber cup 132 when the seal ring 130 is disposed between the shaft 54 and the third cylinder 71*c* in contact abutment with the inner circumference of the third cylinder 71*c*.

The pump body 100 is equipped with the above described structure of the seal ring 130. The pump body 100 is driven by the motor 60 to suck or discharge the brake fluid. Specifically, the gear pumps 19 and 39 are driven by torque of the shaft 54, as transmitted from the motor 60 through an output shaft 60, to achieve the pumping operation.

More specifically, for instance, when the electronic stability control mode, the traction control mode, or the anti-lock brake control mode is entered, the brake ECU 70 activates the electric motor 60 to drive the gear pumps 19 and 39 of the pump body 100. The gear pumps 19 and 39 then execute a basic pumping operation to suck the brake fluid through the inlet paths 90*b* and 92*b* and discharge it through the outlet paths 91 and 93. Specifically, the gear pumps 19 and 39 suck the brake fluid from the reservoirs 20 and 40 and output it to the hydraulic lines A and E.

When the master cylinder 13 does not develop the M/C pressure, for example, in the traction control mode or the electronic stability control mode, the gear pumps 19 and 39 suck the brake fluid through the hydraulic lines D and H and deliver it to the hydraulic lines A and E to pressurize the wheel cylinders 14, 15, 34, and 35. Alternatively, when the master cylinder 13 is generating an undesirably excessive level of the M/C pressure which results in the locking of the wheel(s), for example, in the anti-lock brake control mode, the gear pumps 19 and 39 suck the brake fluid, as drained to the reservoirs 20 and 40 through the hydraulic lines B and F, and output it to keep the reservoirs 20 and 40 from being filled with the brake fluid and increase or decrease the W/C pressures so as to achieve a desired slip ratio.

In the above pumping operation of the pump body 100, the seal ring 120 works as a sealing mechanism to offer beneficial advantages, as described below.

The seal ring 130 creates a hermetical seal between the third cylinder 71*c* and the shaft 54, i.e., between the first chamber and the second chamber, as isolated by the seal ring 130. For instance, when the pressure in the first chamber, as located on either side of the lip mold 132*b* in the axial direction of the seal ring 130 (i.e., the shaft 54), is elevated by the pumping operation above that in the second chamber, as defined on the other side of the lip mold 132b, it will cause the pressure in the first chamber to act on the lip mold 132b, thereby keeping a difference in pressure between the first and second chambers constant and avoiding the transmission of the brake fluid from the first chamber to the second chamber.

If the brake fluid leaks from the first chamber to the second chamber through the seal ring 130, the oil seal 140 serves to block such a fluid leakage from flowing outside it. Further, when the brake fluid is accumulated in the second chamber, and the pressure in the first chamber drops below that in the second chamber after the stop of the pumping operation, it will cause the brake fluid to be returned back to the first chamber through the hydraulic grooves 131i and the slits 132e. For instance, when the brake pedal 1 is not being depressed in the traction control mode, the pressure in the first chamber is not usually increased to a high level, however, when the brake pedal 1 is being depressed in the anti-lock brake control mode, the pressure in the first chamber is usually increased to a high level, thus resulting in a high possibility of leakage of the brake fluid into the second chamber. In such a case, when the vehicle is stopped, and the anti-lock brake control mode is released, so that the pumping operation is terminated, the pressure of the brake fluid in the first chamber will be decreased below that in the second chamber, thus causing the brake fluid to be returned back to the first chamber. The brake fluid, thus, does not leak outside the oil seal 140.

There is also a possibility that the lubricating grease 141 flows following the backflow of the brake fluid to the first chamber from the second chamber. The resinous ring 131 is, as described above, designed to have the hydraulic grooves 131i formed in the end surface 131h. Each of the hydraulic grooves 131i is, as described above, made up of the radial sections and the circumferential section. Specifically, when the brake fluid flows from the center hole of the resinous ring 131 outside the resinous ring 131, each of the hydraulic grooves 131i serves to direct the brake fluid partially in the circumferential direction of the resinous ring 131 without permitting the brake fluid to flow only straight in the radial direction. In other words, each of the hydraulic grooves 131i is designed to define at least a portion of a labyrinthine flow path extending from the center hole (i.e., an inner space) of the resinous ring 131 to one of the slits 132e. The labyrinthine flow path is thin and has an increased length, thus functioning as an orifice.

Particularly, the angular interval between adjacent two of the hydraulic grooves 131i is, as already described, set different from that between adjacent two of the slits 132e, so that all or most of the outer ends of the hydraulic grooves 131i which open on the outer periphery of the resinous ring 131 are located in misalignment with the slits 132e in the radial direction of the seal ring 130. After reaching the outer periphery of the resinous ring 131 from each of the hydraulic grooves 131i, the brake fluid, thus, passes through a clearance between the outer periphery of the resinous ring 131 and the inner periphery of the third cylinder 71c in the circumferential direction of the resinous ring 131 and then reaches one of the slits 132e. This layout of the hydraulic grooves 131i and the slits 132e also complicates the structure of the labyrinthine flow paths extending from the center hole of the resinous ring 131 to the slit 132e.

The labyrinthine flow paths through which the brake fluid flows from inside the resinous ring 131 to the slits 132e facilitate the stay of the lubricating grease 141, which is higher in viscosity than the brake fluid, in the hydraulic grooves 131i or the clearance between the outer periphery of the resinous ring 131 and the inner periphery of the third cylinder 71c. Therefore, when the brake fluid in the second chamber returns back to the first chamber, the lubricating grease 141 stays in the labyrinthine flow paths without flowing into the first chamber. It is easy to form the hydraulic grooves 131i as the labyrinthine flow paths in the resinous ring 131. The degree of freedom of adjustment of the length of the labyrinthine flow paths is high. The hydraulic grooves 131i create an oil reservoir for the grease 141 without consuming a large space in the pump body 100.

Figure 7:
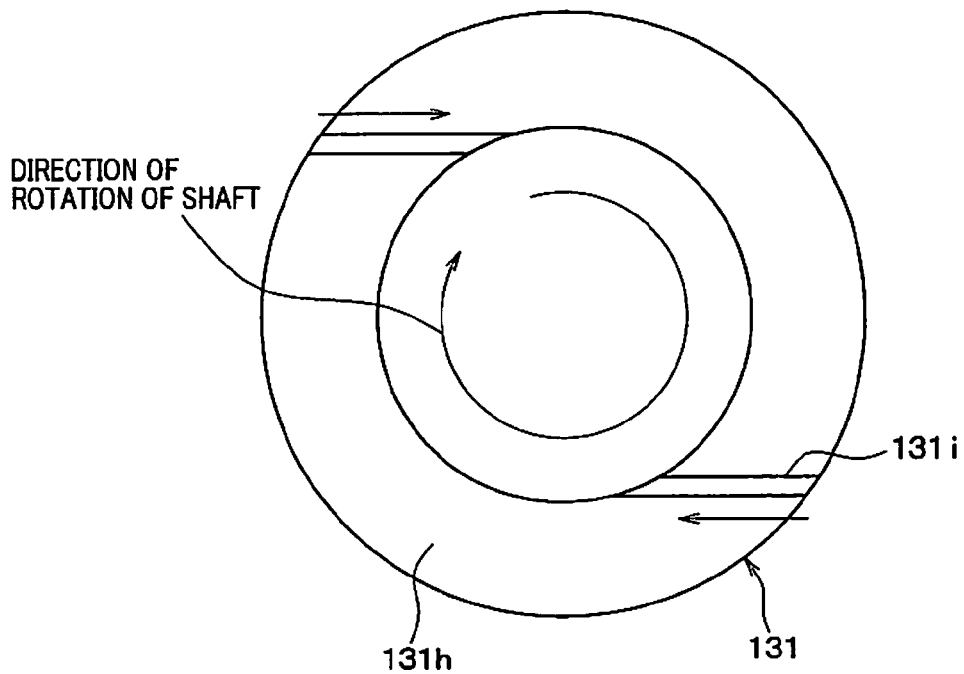
FIG. 7 is an illustration which schematically shows a relation between the direction of rotation of a shaft and the geometry of hydraulic grooves formed in a seal ring.

Each of the hydraulic grooves 131i, as described above, has the circumferential section which leads from the center hole (i.e., the inlet of flow of the brake fluid) of the resinous ring 131 and is directed in a direction opposite the direction in which the shaft 54 normally rotates, thereby producing force to urge the lubricating grease 141 in the hydraulic grooves 131i back to the second chamber. FIG. 7 schematically illustrates a relation between the direction of rotation of the shaft 54 and the geometry of the hydraulic grooves 131i and shows that the inertia force, as produced by the rotation of the shaft 54, acts on the fluid in the hydraulic grooves 131i to return it back to the second chamber 131i. The lubricating grease 141 is greater in viscosity than the brake fluid and insusceptible to movement in the hydraulic grooves 131i as compared to the brake fluid. The lubricating grease 141 is more sensitive to the inertial force than the brake fluid, thus facilitating the ease with which the lubricating grease 141 is returned back to the second chamber. This minimizes the amount of the lubricating grease 141 flowing into the first chamber.

When the lubricating grease 141 stays in the hydraulic grooves 131i, it may disrupt or block the flow of the brake fluid. The lubricating grease 141 is usually insusceptible to adhesion to resin such as PTFE, thus facilitating the unsticking thereof from the resinous ring 131 and ensuring flow paths for the brake fluid in the hydraulic grooves 131i.

Second Embodiment

The second embodiment will be described below which is different only in layout of the hydraulic grooves 131i of the pump body 100 from the first embodiment. Other arrangements of the pump body 100 are identical with those in the first embodiment, and explanation thereof in detail will be omitted here.

Figure 8:
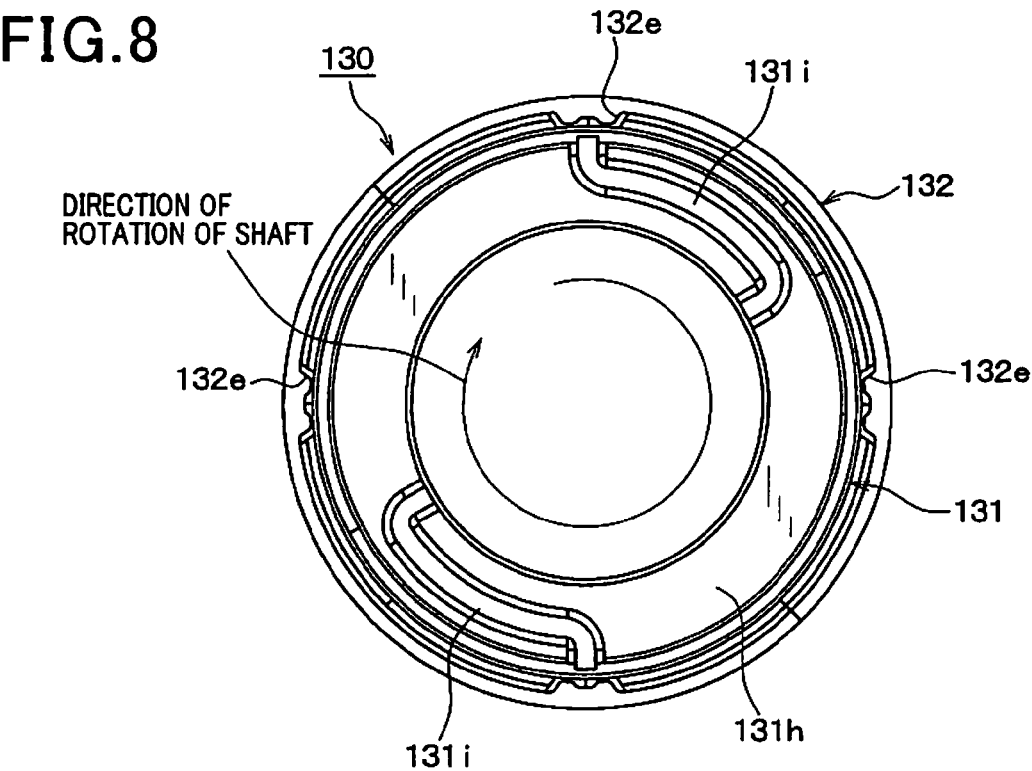
FIG. 8 is an illustration of a seal ring, as viewed from an oil seal of a rotating pumping apparatus of a second embodiment.

The resinous ring 131, as illustrated in FIG. 8, has formed in the end surface 131h facing the oil seal 140 two hydraulic grooves 131i which are identical in structure with those in the first embodiment. The hydraulic grooves 131i are diametrically opposed to each other, that is, located at an interval of 180° away from each other in the circumferential direction of the resinous ring 131.

Use of the two hydraulic grooves 131i provides the same beneficial advantages as described in the first embodiment, but the alignment of the outer end of one of the hydraulic grooves 131i which opens on the outer periphery of the resinous ring 131 with one of the slits 132e in the radial direction of the seal ring 130 will result in alignment of the outer end of the other hydraulic groove 131i with the other slit 132e in the radial direction of the seal ring 130. This results in a decrease in overall length of the labyrinthine flow paths as compared with the first embodiment. The layout of the hydraulic grooves 131i in the first embodiment is, therefore, preferable to that in the second embodiment.

The two hydraulic grooves 131i may alternatively be arranged at an interval other than 180° away from each other in the circumferential direction of the resinous ring 131. This will result in misalignment of the outer end of at least one of the hydraulic grooves 131i with one of the slits 132e in the radial direction of the seal ring 130 even when the outer end of either of the hydraulic grooves 131*i* is aligned with one of the slits 132*e* in the radial direction of the seal ring 130. This is true for the case where the number of the hydraulic grooves 131*i* is four or more as well as two or three.

Third Embodiment

The third embodiment will be described below which is different only in configuration of the hydraulic grooves 131*i* of the pump body 100 from the first embodiment. Other arrangements of the pump body 100 are identical with those in the first embodiment, and explanation thereof in detail will be omitted here.

The resinous ring 131 has formed in the end surface 131*h* facing the oil seal 140 four hydraulic grooves 131*i* each of which extends straight from the center hole (i.e., the inner space) of the resinous ring 131 to the outer periphery (i.e., an outer circumferential surface) of the resinous ring 131 in the radial direction of the resinous ring 131 (i.e., the seal ring 130). The hydraulic grooves 131*i* are arranged at a regular or equal interval away from each other in the circumferential direction of the resinous ring 131. Each of the outer ends of the hydraulic grooves 131*i* which opens on the outer periphery of the resinous ring 131 is misaligned with, that is, offset from an end of a nearest one of the slits 132*e* in the circumferential direction of the resinous ring 131 (i.e., the seal ring 130), thereby forming form a portion of a clearance between the outer periphery of the resinous ring 131 and the inner periphery of the casing (i.e., the third cylinder 71*c*) as being a section of a labyrinthine flow path which extends in the circumferential direction of the resinous ring 131.

Figure 9:
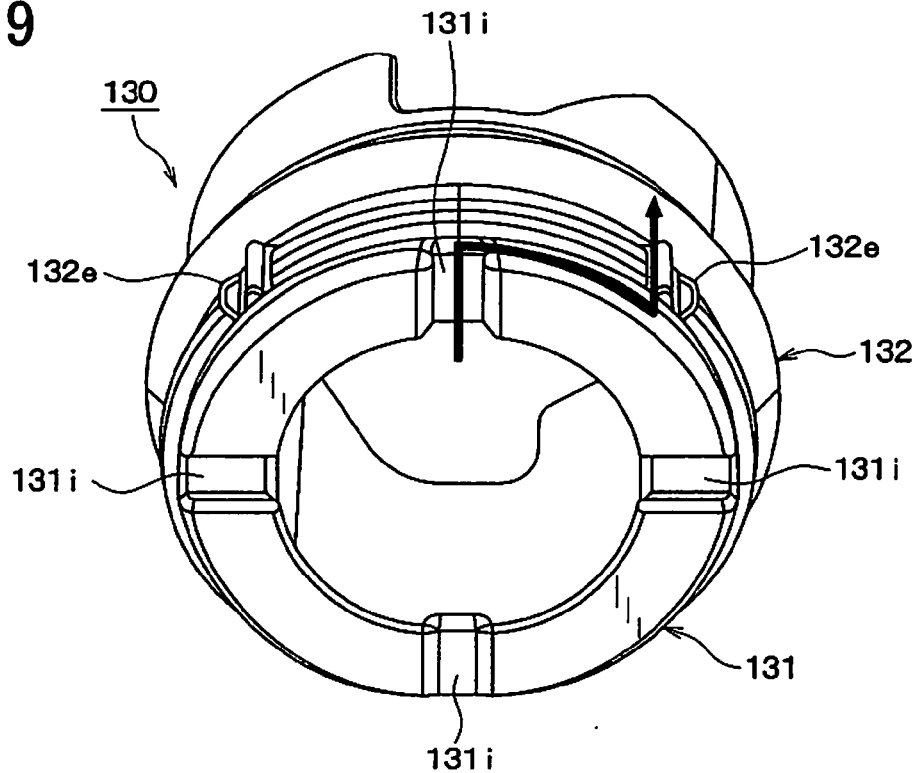
FIG. 9 is a perspective view of a seal ring, as viewed from an oil seal of a rotating pumping apparatus of a third embodiment.
Figure 10:
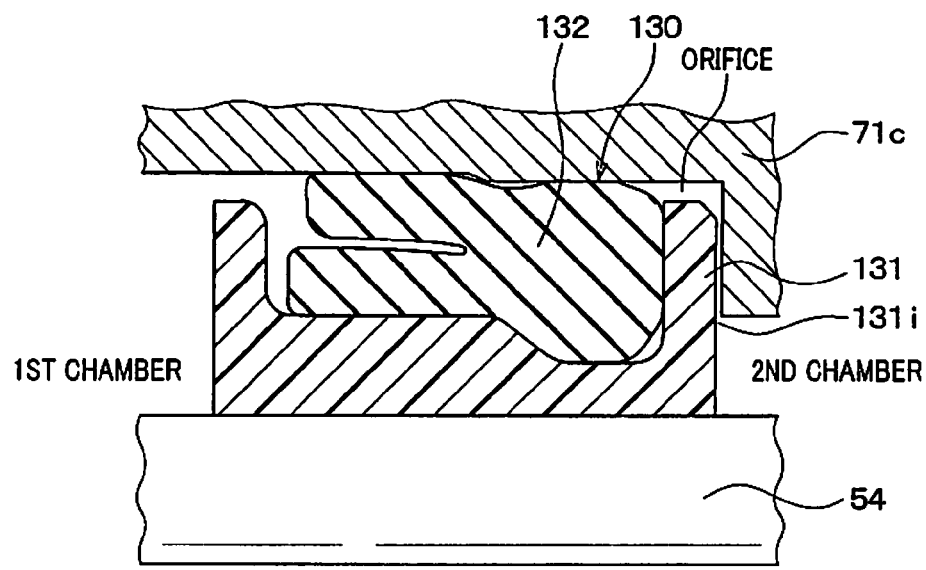
FIG. 10 is a partially enlarged sectional view of the seal ring of FIG. 9 which is installed in a rotating pumping apparatus.

The brake fluid, as demonstrated in FIG. 10, passes through each of the hydraulic grooves 131*i*, hits on an orifice, as defined by the outer periphery of the resinous ring 131 and the inner periphery of the third cylinder 71*c*, and travels through the orifice in the circumferential direction of the seal ring 130. Specifically, the brake fluid flows, as illustrated in FIG. 9, through labyrinthine flow paths (only one is indicated by an arrow) until the slits 132*e*. This structure of the resinous ring 131, therefore, creates the labyrinthine flow paths which are long and thin.

As apparent from the above, the clearance between the outer periphery of the resinous ring 131*i* and the inner periphery of the third cylinder 71*c* is used as part of each of the labyrinthine flow paths to offer the substantially same advantages as in the first embodiment.

The resinous ring 131 of this embodiment, as described above, has the four hydraulic grooves 131*i*, so that the interval between adjacent two of the hydraulic grooves 131*i* is identical with that between adjacent two of the slits 132*e*. When the seal ring 130 is assembled, each of the outer ends of the hydraulic grooves 131*i* is located out of alignment with one of the slits 132*e*, but there is a possibility that when the resinous ring 131 or the rubber cup 132 is rotated during the pumping operation, it results in alignment of each of the outer ends of the hydraulic grooves 131*i* with one of the slits 132*e*. Such a possibility is eliminated by locking the resinous ring 131 and the rubber cup 132 from turning relative to each other. Such locking may be achieved by forming a recess in one of the resinous ring 131 and the rubber cup 132 and a protrusion in other of them, and fitting the protrusion in the recess to make a rotation stopper. For instance, the resinous ring 131 is designed to have the protrusion or the recess on or in the inner side wall 131*b* or the bottom wall 131*d*, while the rubber cup 132 is formed to have the recess or the protrusion in or on the annular base 132*a*.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

Figure 11A:
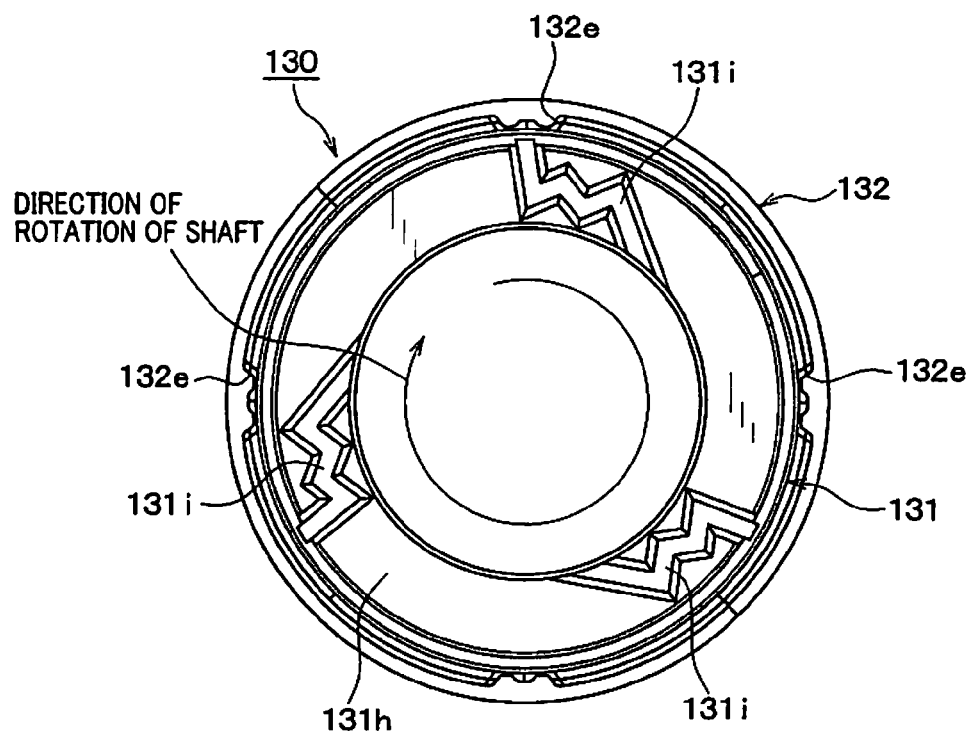
FIG. 11(a) is a side view of a first modification of a seal ring installed in the rotating pumping apparatus of FIG. 2.
Figure 11B:
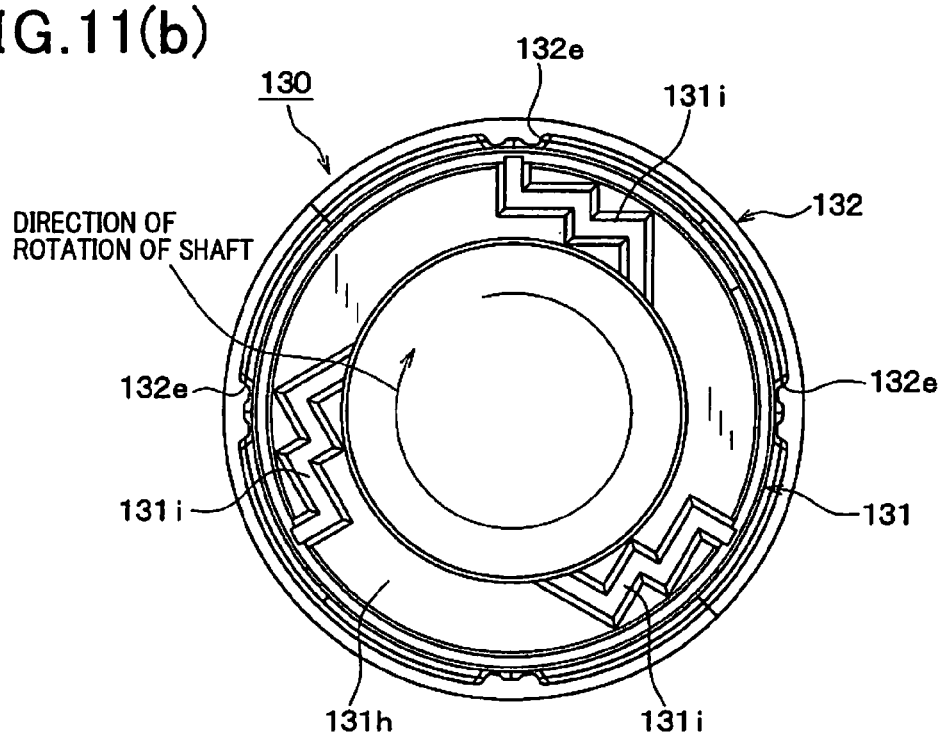
FIG. 11(b) is a side view of a second modification of a seal ring installed in the rotating pumping apparatus of FIG. 2.
Figure 11C:
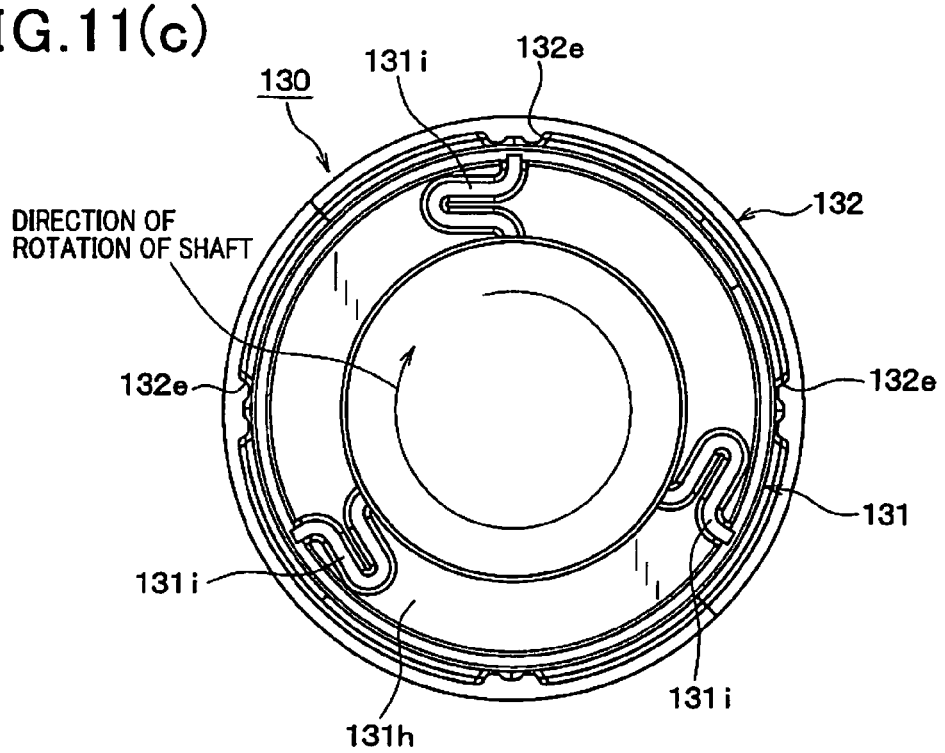
FIG. 11(c) is a side view of a third modification of a seal ring installed in the rotating pumping apparatus of FIG. 2.

The hydraulic grooves 131*i* may be designed to be different in configuration between the first embodiment and the second embodiment. For example, each of the hydraulic grooves 131*i* may be formed, as illustrated in FIGS. 11(*a*), 11(*b*), and 11(*b*), to have a plurality of bends between the center hole and the outer periphery of the resinous ring 131. In FIG. 11(*a*), each of the hydraulic grooves 131*i* is made up of a plurality of sections extending in the radial or circumferential direction of the resinous ring 131 in the shape of a triangular waveform. In FIG. 11(*b*), each of the hydraulic grooves 131*i* is made up of a plurality of sections extending parallel to either of the radial and circumferential directions of the resinous ring 131 in a stepwise shape. In FIG. 11(*c*), each of the hydraulic grooves 131*i* is curved into a U-shape which extends in the radial direction, in the circumferential direction, being folded back, and then extends in the radial direction of the resinous ring 131.

The resinous ring 131 may be designed to have a single groove which is formed in any of the shapes, as described above.

The rubber cup 132 and the resinous ring 131 are preferably designed to have the slits 132*e* and the hydraulic grooves 131*i* arranged in a layout, as described below, to establish misalignment of most of the outer ends of the hydraulic grooves 131*i* with the slits 132*e* in order to increase the overall length of the labyrinthine flow paths between the inner ends of the hydraulic grooves 131*i* and the slits 132*e*. For instance, the rubber cup 132 is formed to have n slits 132*e* (where n is a natural number of three or more) arranged at an equal interval away from each other in the circumferential direction of the rubber cup 132. The resinous ring 131 is formed to have n−1 or n+1 slits 132*e* (where n is a natural number of three or more) arranged at an equal interval away from each other in the circumferential direction of the resinous ring 131. The outer ends of at least n−2 of the n−1 or n+1 hydraulic grooves 131*i* are arranged out of alignment with the slits 132*e*, respectively, in the radial direction of the seal ring 130. In other words, the outer ends of at least n−2 of the n−1 or n+1 hydraulic grooves 131*i* are offset from the ends of the slits 132*e*, respectively, in the circumferential direction of the seal ring 130. The outer ends of the hydraulic grooves 131*i* are, as described above, outlets which open on the outer periphery of the resinous ring 131.

The rubber cup 132 in each of the above embodiments may be formed to have various configurations as long as it has formed in the outer periphery thereof the slits 132*e* through which the brake fluid which has leaked into the above described second chamber is permitted to return back to the first chamber when the pressure in the first chamber has dropped below that in the second chamber.

The rotating pumping apparatus in each of the above embodiments is equipped with the gear pumps 19 and 39, however, may alternatively be engineered to have vane pumps.

What is claimed is:

1. A rotating pumping apparatus comprising:
a rotating pump;
a shaft which drives the rotating pump;
a casing which has formed therein a hole in which the shaft is disposed;
a sealing member which is disposed around the shaft between an inner periphery of the hole and an outer periphery of the shaft and creates a hermetical seal between the inner periphery of the hole and the shaft, the sealing member being equipped with a resinous ring and a rubber cup fit on an outer periphery of the resinous ring, the rubber cup having formed in the outer periphery thereof a first groove which extends in an axial direction of the shaft;
an oil seal which is disposed around the shaft between the inner periphery of the hole and the outer periphery of the shaft and creates a hermetical seal between the inner periphery of the hole and the shaft; and
lubricating grease disposed between the oil seal and the shaft,
wherein the resinous ring has an end surface which faces the oil seal and is located closer to the oil seal than the rubber cup is, the end surface having formed therein a second groove which extends from an inner space of the resinous ring to an outer periphery of the resinous ring,
wherein the second groove defines a labyrinthine flow path which has sections extending in a radial direction and a circumferential direction of the resinous ring, respectively,
wherein the sections of the second groove extending in the radial and circumferential directions of the resinous ring are connected through a bend,
wherein a length of the second groove is greater than a width in a radial direction of the resinous ring, and the second groove has an inlet and an outlet which are offset from each other in a circumferential direction of the resinous ring;
wherein the sections extending in the radial direction and the circumferential direction include a first radial section, a second radial section and a circumferential section, the first and second radial sections being in fluid communication through the circumferential section; and
wherein a first bend connects the first radial section with the circumferential section and a second bend connects the second radial section with the circumferential section.

2. A rotating pumping apparatus as set forth in claim 1, wherein the second groove formed in the end surface of the resinous ring has sections extending in the radial and circumferential directions of the resinous ring.

3. A rotating pumping apparatus as set forth in claim 2, wherein an outer end of the second groove which opens on an outer periphery of the resinous ring is offset from an end of the first groove in the circumferential direction of the sealing member.

4. A rotating pumping apparatus as set forth in claim 3, wherein the rubber cup also has formed in the outer periphery thereof a total of n first grooves which include said first groove, each of the first grooves extending in the axial direction of the shaft, wherein the resinous ring also has a total of n−1 or n+1 second grooves which include said second groove, each of the second grooves extending from the inner space of the resinous ring to the outer periphery of the resinous ring and having an outer end which opens on the outer periphery of the resinous ring, and wherein the outer ends of at least n−2 of the n−1 or n+1 second grooves are arranged out of alignment with ends of the first grooves, respectively, in the radial direction of the sealing member.

5. A rotating pumping apparatus as set forth in claim 2, wherein one of the sections of the second groove directed in the circumferential direction of the resinous ring leads from the inner space of the resinous ring in a direction opposite in a direction in which the shaft rotates.

6. A rotating pumping apparatus as set forth in claim 1, wherein the second groove extends in the end surface of the resinous ring in the radial direction of the resinous ring and has an outer end which opens on the outer periphery of the resinous ring, the outer end being offset from the first groove in the circumferential direction of the sealing member to form a portion of a clearance between the outer periphery of the resinous ring and an inner periphery of the casing as being one of the sections of the labyrinthine flow path which extends in the circumferential direction of the resinous ring.

7. A rotating pumping apparatus as set forth in claim 4, wherein the second grooves communicate with the first grooves to define labyrinthine flow paths, respectively.

8. A rotating pumping apparatus comprising:
a rotating pump;
a shaft which drives the rotating pump;
a casing which has formed therein a hole in which the shaft is disposed;
a sealing member which is disposed around the shaft between an inner periphery of the hole and an outer periphery of the shaft and creates a hermetical seal between the inner periphery of the hole and the shaft, the sealing member being equipped with a resinous ring and a rubber cup fit on an outer periphery of the resinous ring, the rubber cup having formed in the outer periphery thereof a first groove which extends in an axial direction of the shaft;
an oil seal which is disposed around the shaft between the inner periphery of the hole and the outer periphery of the shaft and creates a hermetical seal between the inner periphery of the hole and the shaft; and
lubricating grease disposed between the oil seal and the shaft,
wherein the resinous ring has an end surface which faces the oil seal and is located closer to the oil seal than the rubber cup is, the end surface having formed therein a second groove which extends from an inner space of the resinous ring to an outer periphery of the resinous ring,
wherein the second groove defines a labyrinthine flow path which has sections extending in a radial direction and a circumferential direction of the resinous ring, respectively,
wherein the sections of the second groove extending in the radial and circumferential directions of the resinous ring are connected through a bend,
wherein a length of the second groove is greater than a width in a radial direction of the resinous ring, and the second groove has an inlet and an outlet which are offset from each other in a circumferential direction of the resinous ring;
wherein the sections extending in the radial direction and the circumferential direction include a first radial section, a second radial section and a circumferential section, the circumferential section being disposed between the first and second radial sections; and wherein a first bend connects the first radial section with the circumferential section and a second bend connects the second radial section with the circumferential section.

9. The rotating pumping apparatus as set forth in claim 1, wherein the second groove formed in the end surface of the resinous ring forms a path that has at least one bend.

10. A rotating pumping apparatus comprising:
a rotating pump;
a shaft which drives the rotating pump;
a casing which has formed therein a hole in which the shaft is disposed;
a sealing member which is disposed around the shaft between an inner periphery of the hole and an outer periphery of the shaft and creates a hermetical seal between the inner periphery of the hole and the shaft, the sealing member being equipped with a resinous ring and a rubber cup fit on an outer periphery of the resinous ring, the rubber cup having formed in the outer periphery thereof a first groove which extends in an axial direction of the shaft;
an oil seal which is disposed around the shaft between the inner periphery of the hole and the outer periphery of the shaft and creates a hermetical seal between the inner periphery of the hole and the shaft; and
lubricating grease disposed between the oil seal and the shaft,
wherein the resinous ring has an end surface which faces the oil seal and is located closer to the oil seal than the rubber cup is, the end surface having formed therein a second groove which extends from an inner space of the resinous ring to an outer periphery of the resinous ring,
wherein the second groove defines a labyrinthine flow path which has sections extending in a radial direction and a circumferential direction of the resinous ring, respectively,
wherein the sections of the second groove extending in the radial and circumferential directions of the resinous ring are connected through a bend,
wherein a length of the second groove is greater than a width in a radial direction of the resinous ring, and the second groove has an inlet and an outlet which are offset from each other in a circumferential direction of the resinous ring;
wherein the second groove formed in the end surface of the resinous ring forms a bath that has at least one bend; and
wherein a first bend connects the first radial section with the circumferential section and a second bend connects the second radial section with the circumferential section.

* * * * *